C. D. TISDALE.
Car Axle.
No. 39,533.
Patented Aug. 11, 1863.
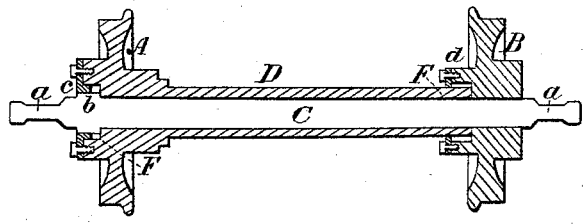
Witnesses:
R. H. Eddy
Inventor:
C. D. Tisdale

UNITED STATES PATENT OFFICE.

C. D. TISDALE, OF EAST BOSTON, MASSACHUSETTS, ASSIGNOR TO C. D. AND B. W. TISDALE AND M. B. BOYNTON, OF SAME PLACE.

IMPROVEMENT IN CAR-AXLES.

Specification forming part of Letters Patent No. 39,533, dated August 11, 1863.

*To all whom it may concern:*

Be it known that I, CHARLES D. TISDALE, a resident of East Boston, in the county of Suffolk and State of Massachusetts, have invented a new and useful Improvement in Railway-Carriage Axles; and I do hereby declare the same to be fully described in the following specification and represented in the accompanying drawing, which denotes a longitudinal section of an axle and two wheels applied together in accordance with my invention.

When two wheels and an axle are applied together as hereinafter described, either of the wheels can revolve independently of the other, so that when running on a curve of the railway-track the wheel which may be on the outer or longer rail of the track may revolve without producing any slipping of the other wheel on its rail. I am aware that this effect is not new, or, in other words, that wheels and axles have been so made and applied together as to produce such a result when in use; but under such circumstances I believe the axle to have been constructed in two distinct parts, each being applied to a wheel so as to revolve with it. An axle so made is shown in the United States Patent No. 27,966, dated April 24, 1860.

My invention or improvement differs essentially therefrom, as in it the main axle is in one entire piece, and has a journal arranged at each of its extremities. This axle goes through both wheels, and is fastened to one of them only, the other wheel being fixed to a tubular sleeve which encompasses the axle and extends from one wheel to the other. Each wheel is provided with a stuffing-box, one of which is arranged on the inner side of one wheel, while that of the other is arranged on its outer side. Furthermore, the axle has a shoulder or collar to run in the last-mentioned stuffing-box, the said shoulder or collar being fast to the axle.

The object of the two stuffing-boxes and the shoulder or collar is to prevent the escape of oil from the sleeve, which oil may be put therein through an aperture made laterally into the sleeve, and provided with a screw or plug for closing it, as circumstances may require.

In the drawings, A and B are the two wheels; C, the axle, of which $a\ a$ are the journals, and $b$ the shoulder or fixed collar.

D is the sleeve, and E and F are the stuffing-boxes, $c$ being the annular cap of one and $d$ that of the other, the whole being arranged as shown in the said drawing, and as hereinbefore described. By having the single axle running through both wheels, and a sleeve extending from one to the other of them, there is not that danger of breakage of the axle as is the case where the axle is made in two parts and provided with a sleeve to extend over but part of the distance between the two wheels.

I do not claim any invention shown or described in the said patent hereinbefore referred to; but What I do claim is—

My improved arrangement and application of the wheels, their sleeve, axle, and stuffing-boxes, substantially in manner as described.

C. D. TISDALE.

Witnesses:
R. H. EDDY,
F. P. HALE, Jr.